July 22, 1969

C. M. WISE 3,456,503

FREE FLIGHT WIND TUNNEL MODEL LAUNCHER

Filed Dec. 28, 1966

INVENTOR
Charles M. Wise

BY J. O. Tresanoky
ATTORNEY

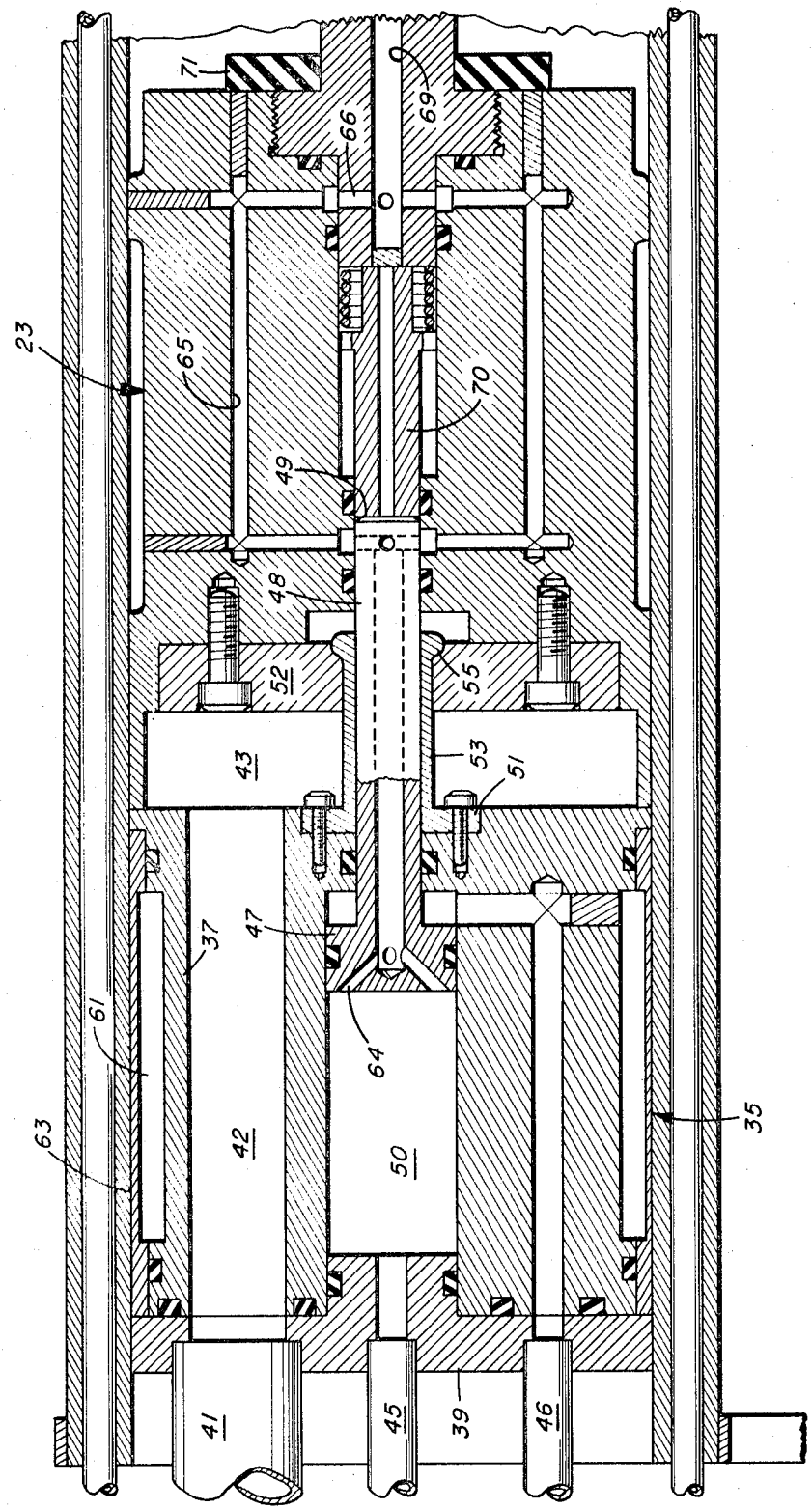

United States Patent Office 3,456,503
Patented July 22, 1969

3,456,503
FREE FLIGHT WIND TUNNEL
MODEL LAUNCHER
Charles M. Wise, New Carlisle, Ohio, assignor to the United States of America as represented by the Secretary of the Navy
Filed Dec. 28, 1966, Ser. No. 605,520
Int. Cl. G01m 9/00
U.S. Cl. 73—147                                 8 Claims

ABSTRACT OF THE DISCLOSURE

A device is provided for launching models for free flight within a wind tunnel. Means are provided to control the velocity of the model, to change the angle of attack of the model, and to rotate the model. In addition, the model may be sprayed with fluid to control its temperature.

---

The invention described herein may be manufactured and used by or for the Government of the United States of America for governmental purposes without the payment of any royalties thereon or therefor.

This invention relates to apparatus for launching aerodynamic models for free flight within a wind tunnel and more particularly to apparatus for launching aerodynamic models within a wind tunnel in which a rotational spin may be applied to the model prior to launching.

In the wind tunnel testing of areodynamic models, two methods have been generally employed. One method involves mounting of the model in a stationary manner within a wind tunnel with the model facing an air stream. The other method involves the launching of a model into the air stream of a wind tunnel. This method, referred to as the free flight method, provides the unique advantage over the first mentioned method in that only true aerodynamic forces act on the model in flight.

In the past, in the free flight launching of models, the control conditions were usually limited to adjustment of the initial angle of attack, temperature and velocity of the model. One method of temperature control was effected by injecting a cooling shield into the air flow forward of the model. The model was usually attached to a launching arm by slip fitting a slot in the base of the model over a tongue on the end of a launching arm. External fingers were used to support the model during the wind tunnel starting period and were removed by an electric motor or an air operated piston drive. One of the disadvantages of this type of launching arrangement was the necessity of a slot in the model to receive the launching arm tongue which tended to change the aerodynamic characteristics of the model. Another disadvantage of this prior art arrangement was that no provision could be made for spinning the model prior to launching. Spinning the model prior to launching is desirable in order to more accurately simulate the flight conditions of a missile.

In the instant invention free flight launching apparatus is provided with which a model may be launched under controlled conditions of velocity, initial angle of attack, and temperature. In addition, the model may be given a rotational spin prior to launching.

It is an object of this invention to provide apparatus for launching free flight aerodynamic models in wind tunnels under controlled launching conditions.

Another object of this invention is to provide apparatus for the free flight launching of aerodynamic models in which the temperature of the model is controlled.

A further object of this invention is to provide apparatus for the free flight launching of aerodynamic models in which a spin is applied to the model prior to launching.

Still another object of this invention is to provide apparatus for the free flight launching of an aerodynamic model under controlled conditions of spin, angle of attack, velocity, and/or temperature.

Still another object of this invention is to provide apparatus for launching aerodynamic models for free flight in such a manner that the trajectory of the model will be within the viewing range of the wind tunnel.

According to the present invention, the foregoing and other objects are attained by apparatus having a launching tube with a driving piston therein. The driving piston is connected by a shaft to a spin head adapted for holding and spinning an aerodynamic model prior to launching. The spin head contains an air motor for rotating the model prior to launching. The spin head is provided with releasable fingers for holding the model prior to launching and for releasing the model immediately prior to launching. A more complete appreciation and many of the attendant advantages of this invention will be readily apparent as the same becomes better understood by reference to the following detailed description when considered in connection with the accompanying drawings wherein:

FIG. 3 illustrates in detail the piston and drive unit assembly of this invention;

Figure 1:
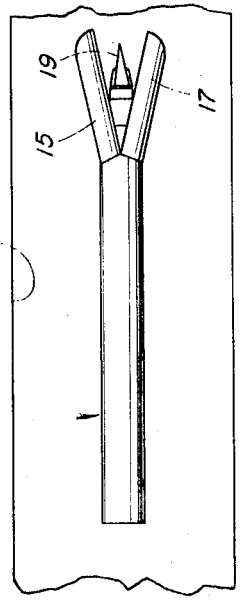
FIG. 1 illustrates the model launcher of this invention positioned within a wind tunnel.

Referring now to FIG. 1, a launching tube 11, positioned within wind tunnel 13, is equipped with a pair of jaws 15 and 17. Jaws 15 and 17 form a protective nose portion of the launcher when closed and provide clearance for launching a model 19 when opened.

Figure 2:
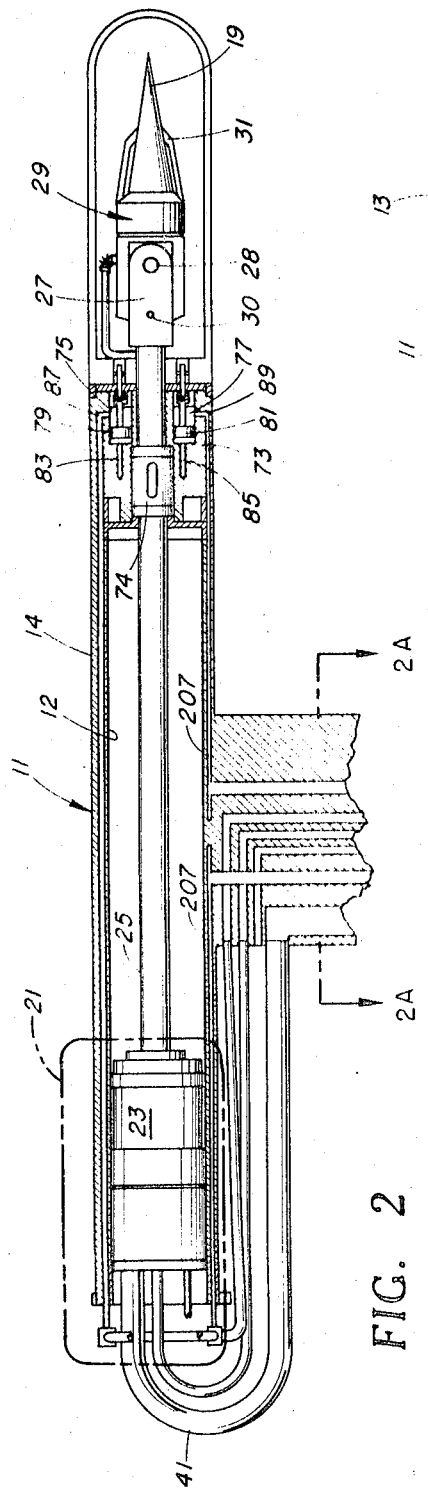
FIG. 2 illustrates, in cross section, the launcher assembly.

In FIG. 2, the launching tube 11 is illustrated as having an inner cylinder 12 and an outer jacket 14. A piston and driver assembly 21 located at the back portion of the launching tube and positioned within cylinder 12 includes a driving piston 23 which is connected to one end of a hollow shaft 25. The other end of shaft 25 is connected through a yoke 27 to a spin head assembly 29. The yoke type connection between the shaft and the spin head assembly provides for adjusting the angle of attack of model 19 prior to launching. Spin head assembly 29 includes a turbine or air motor for giving an initial rotational spin to the model. Spin head assembly 29 also includes fingers 31 which hold model 19 in position on the spin head.

Referring now to FIG. 3, piston 23 is held in a locked position by a driving unit assembly 35. The driving unit assembly has a main body portion 37 with a rear mounting plate 39 secured thereto. A tube 41 which is secured to mounting plate 39 provides for the application of air or gas to the driving piston 23. The gas pressure is applied through a passage 42 to a chamber 43 adjacent to piston 23. An air tube 45 is secured to mounting plate 39 and provides for applying air under pressure for the spin and lock operation which will be described hereinafter. A tube 46 provides for applying air under pressure to the rear portion of release piston 47 for releasing driving piston 23 at the initiation of the launch. Release piston 47 has a hollow shaft portion integral therewith and further having an end portion 49 which extends within piston 23. Piston 23 is provided with an end plate 52 which is bolted, or otherwise secured, to the main body of piston 23. A locking means 51 is provided which is made up of a plurality of splines or fingers 53, which are axially disposed and circumferentially spaced apart, have enlarged end portions 55. Enlarged end portions 55 form effectively a flange which keeps piston 23 in locked engagement with the driving unit assembly when shaft 48 is inside of piston 23, displaces the larged end portions 55 radially outwardly. Piston 23 is released from locked engagement by removing shaft 48 from within the piston which removal allows the enlarged end portions to move radially inwardly and slip through the hole in piston 23. Air under pressure applied to the rear side of release piston 47 causes shaft 48 to be removed from piston 23. The removal of shaft 48 from piston 23 thus releases the piston for movement so that the launching may be initiated.

Air under pressure is also applied in a conventional manner to annular chamber 61 (not shown in the drawings) which causes a thin outer wall 63 to be pressed against cylinder wall 12, holding the driving unit 37 from moving along the cylinder 12 just prior to and during launching. By using such an arrangement the drive unit may be positioned anywhere along the cylinder prior to launching, thus providing a variable stroke and velocity for piston 23. Different lengths of shaft 25 may be used when the position of the driver unit is moved substantially. It is noted that the velocity may also be varied by varying or regulating the air or gas pressure applied to piston 23.

In addition to urging release piston 47 into the locking position with shaft 48 inside piston 23, the air under pressure applied from tube 45 is also applied through air passages 64 in piston 47 to a hollow inner portion of shaft 48. Shaft 48 is further provided with radial holes which communicate with air passages 65 within the body of piston 23. Air passages 65 lead to and communicate with radial holes 66 which in turn lead to and communicate with a hollow center portion 69 of shaft 25. Air under pressure flows through center portion 69 of shaft 25 to a turbine or air motor within the spin head assembly. When the release piston 47 moved rearward by the release of air pressure, shaft 48 is removed from piston 23 and a spring loaded plunger 70 within piston 23 moves rearward to block air passages 64 thereby to prevent the escape of air pressure used for the turbine or air motor in the spin head assembly 29.

An impact cushioning means such as resilient washer 71 is provided at the forward end of piston 23 to cushion the impact when the piston comes to a stop at the end of its travel at which point the piston impacts with a support block 73.

The driving piston 23 may be returned to its initial position, abutting the driving unit, by the application of air under pressure to the back side of the piston.

Figure 4:
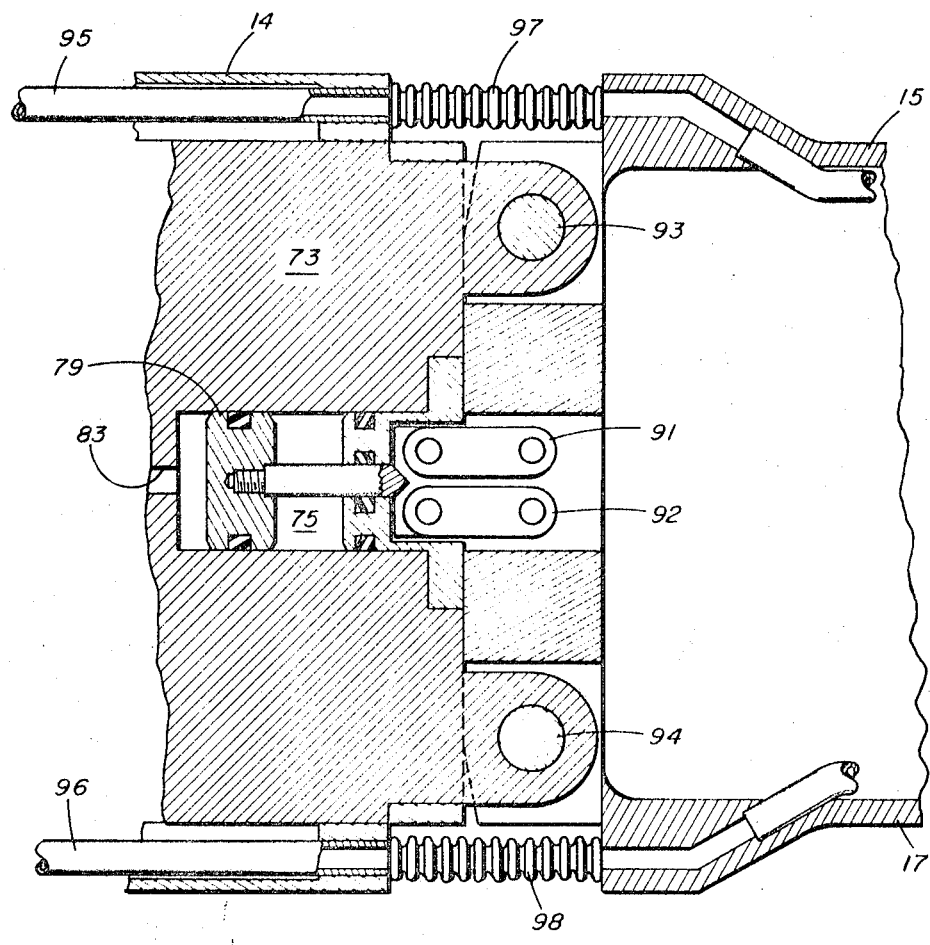
FIG. 4 illustrates in detail the jaw opening mechanism of the launching tube.

The shaft 25 contains a plurality of ball spline grooves which engage with ball bearings within a ball bushing 74. Bushings such as ball bushing 74 may be obtained from the Saginaw Division of General Motors Corp., Saginaw, Mich. Ball bushing 74 in cooperation with the ball sprine grooves in shaft 25 prevent the shaft from rotating. Support block 73 is provided with chambers 75 and 77 which house double acting pistons 79 and 81 respectively. Pistons 79 and 81 provide opening and closing means for jaws 15 and 17. Pistons 79 and 81 are provided with ports 83 and 85 respectively for delivering air under pressure to the pistons opening the jaws and with ports 87 and 89 respectively for delivering air under pressure to the pistons for closing the jaws. Each of the pistons 79 and 81 are connected to both jaws 15 and 17. This structural feature is more clearly illustrated in FIG. 4 in which piston 79 is connected through links 91 and 92 to jaws 15 and 17. Piston 81 is similarly connected to jaws 15 and 17. Jaws 15 and 17 are pivotally mounted on pins 93 and 94 to support block 73. Tubes 95 and 96 are provided with flexible bellows portion 97 and 98 respectively such that the tubes may flex when jaws 15 and 17 are opened. Tubes 95 and 97 provide for the application of liquid or gaseous fluids in a conventional manner from a source (not shown in the drawings) to the model for cooling the model when temperature control of the model is needed or desired.

Figure 5:
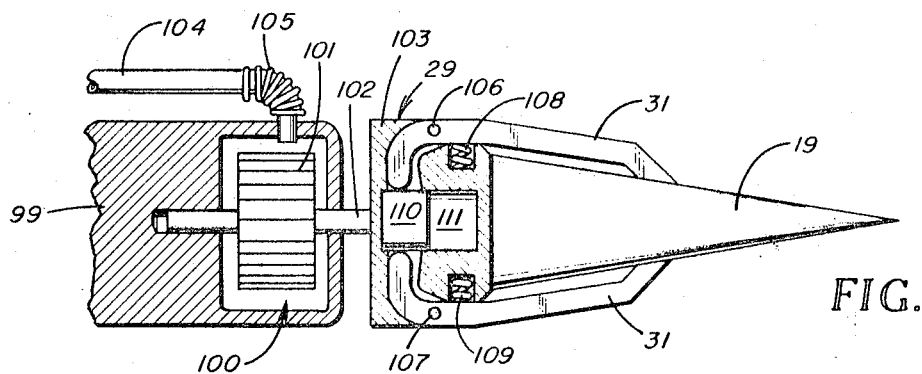
FIG. 5 illustrates the spin head assembly of this invention.

Referring now to FIGS. 2 and 5, the spin head assembly is illustrated as being connected to shaft 25 through yoke 27. Yoke 27 pivotally connects to the spin head assembly through pin 28 and another pin axially aligned with pin 28, not show. A set screw 30 provides a means for setting the initial angle of attack of model 19 prior to launching. In FIG. 5, the spin head assembly 29 is illustrated in more detail in which the stationary portion 99 contains a turbine 100 therein. A turbine blade 101 is provided which is mounted on shaft 102. Turbine blade 101 and shaft 102 are rotatable with respect to stationary portion 99. Shaft 102 is fixedly attached to the rotatable portion or body 103 of the spin head assembly. A tube 104 having a flexible portion 105 forms an air passage which connects the air passage 69 within shaft 25 to the blades 101 of the turbine 100.

Fingers 31, which hold a model such as model 19 an the spin head prior to launching, are pivotally mounted by pins 106 and 107. Fingers 31 are spring loaded to open by the force of biasing means such as springs 108 and 109. Fingers 31 are held in a releasable closed position by an inertially moveable slug 110 prior to launching. Slug 110 when positioned at the rearward portion of chamber 111 is illustrated, displaces the rear portion of the fingers outwardly and the forward portion of the fingers inwardly, to press against the model body, holding the model in position within the launching tube. The slug 110 is moved forward by inertial forces which result when piston 23 comes to a stop at the end of its travel, causing fingers 31 to open to release model 19 for flight.

Figure 2A:
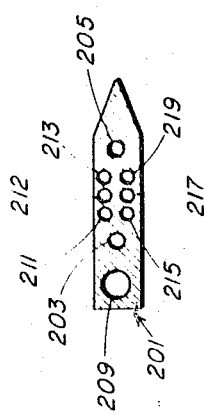
FIG. 2A is a cross sectional view of the base portion of the launcher assembly.

Referring to FIGS. 2 and 2A, a base portion 201 is illustrated which provides a support for launching tube 11 and carries various fluid carrying tubes. Tubes 203 and 205 are water tubes for providing cooling water to and from the water jacket 207. Tube 209 provides for conducting air or gas under pressure to the driving piston and connects to tube 41. Tubes 211–219 provide means for conduting liquid or gaseous fluids to the launching tube for the various control functions.

OPERATION

The first steps in the launching operation are the spinning and locking steps which occur simultaneously. Air under pressure is applied through tube 45 for both spinning and locking. At the time of the initiation of the spin and lock steps, piston 23 is in abutting relationship to the driving unit body as illustrated in FIG. 3. Release piston 47, however, is at this time located at rear portion of chamber 50 and shaft 48 is withdrawn from the driving piston 23. With the application of air under pressure to chamber 50, piston 47 is driven forward, causing shaft 48 to be inserted within piston 23 and within locking member 51, causing the enlarged portions 55 thereof to be pressed against plate 52, causing the driving piston 25 to become locked in this position.

Simultaneously, air under pressure is applied through the hollow passages 64, 65 and 66 to the inner hollow passageway 69 in shaft 25. From passageway 69, the air under pressure passes into tube 104 to the blades of the turbine within the spin head assembly 29, causing turbine blades and consequently the spin head 103 to rotate. The model is thus given a spin or rotational motion prior to launching.

Subsequent to the completion of the lock and spin steps, the next steps in the operation are that of releasing the driving piston 23 and launching the model. Just prior to the releasing and launching steps, air under pressure is applied in a conventional manner to pistons 79 and 81 through ports 83 and 85 (not shown in the drawing) causing jaws 15 and 17 to open, exposing the model to the air stream in preparation for launching. At this time air under pressure is applied to chamber 43 to provide a force for moving the piston 25 during launching. After the jaws have been opened and air pressure has been applied to chamber 43, air under pressure is applied through tube 46 to the rear portion of releases piston 47, which causes shaft 48 to be removed from piston 25, thereby releasing the piston for travel along the launching tube. The piston 25 will travel along the interior cylindrical surface of the launching tube until the washer 71 comes in contact with the support block 73, at which time piston 23 will come to an abrupt stop. This abrupt stoppage will cause an inertial force to be transmitted to slug 110, moving slug 110 to the forward end of chamber 111. The movement of slug 110 allows the spring biased fingers to open and thus release model 19 for flight.

The velocity of the piston is determined by the length of shaft used and the magnitude of the pressure applied to the driving piston. The velocity of the piston may be measured by installing magnets at regular intervals, such as ½ inch for example, along the length of the shaft. A toroidal coil may be installed in the forward wall of the launching tube. As the magnets pass the coil, a change in magnetic field is produced. The change in magnetic field may then be read on an indicating device such as an oscilloscope.

Obviously many modifications and variations of the present invention are possible in the light of the above teachings. It is therefore to be understood, that the invention may be practiced otherwise than specifically described.

What is claimed and desired to be secured by Letters Patent of the United States is:

1. Apparatus for launching an aerodynamic model within a wind tunnel comprising:
   a launching tube having an inner cylindrical surface,
   a driving piston slideably engaging said cylndrical surface,
   driving means within said cylindrical surface,
   a rotatable spin head for holding the model,
   means releaseably securing said piston to said driving means,
   yoke means,
   shaft means connected to said piston at one end thereof and to said yoke means at the other end thereof,
   said yoke means including horizontally disposed pivot means connecting said shaft means to said spin head whereby the vertical angle of said spin head may be adjusted,
   turbine means within said yoke means having a shaft connected to said spin head and the model,
   means applying gas under pressure to said piston whereby said piston may be driven substantially the length of said tube to impart a launching velocity to said model,
   support block means for stopping said piston,
   inertially releaseable holding means releaseably holding said model to said spin head,
   said inertially releaseable holding means releasing said model for flight when said piston contacts said support block means, and means for receiving a fluid spray for controlling the temperature of said model.

2. Apparatus for launching an aerodynamic model within a wind tunnel comprising:
   a linearly disposed launching tube adapted to be disposed within a wind tunnel,
   a piston slideably disposed within said tube,
   a spin head adapted for rotation including inertially releasable holding means for releasably holding the model,
   yoke means horizontally pivotally connecting said piston to said spin head for adjusting the vertical angle of said spin head,
   means applying a rotation to said spin head and said model before said model is launched,
   driving means for releasably holding said piston, and for applying gas under pressure to said piston whereby said piston will move along the length of said tube when said piston is released,
   said inertially releasable holding means adapted to release said model into a wind tunnel when said piston is stopped by an impact stopping means,
   and fluid spray receiving means within said tube for controlling the temperature of said model.

3. Apparatus as in claim 2 in which said means applying a rotation to said spin head includes a turbine rotated by air under pressure applied through said piston.

4. Apparatus as in claim 3 in which said inertially releasable holding means comprises spring loaded fingers which are held in a closed position around said model by an inertially moveable slug.

5. Apparatus as in claim 4 in which said driving means includes a locking means holding said piston to said driving means, a release piston holding said locking means in a locking position, and a source of air under pressure for removing said release piston from said locking means to release said piston.

6. Apparatus as in claim 2 in which said inertially releasable holding means includes spring loaded fingers which are held in the closed position around said model by an inertially movement slug.

7. Apparatus as in claim 2 in which said driving means includes a locking means holding said piston to said driving means, a release piston holding said locking means in a locking position, and a source of air under pressure for removing said release piston from said locking means to release said piston.

8. Apparatus for launching a model within a wind tunnel comprising:
   a linearly disposed launching tube,
   inertially releasable means for holding said model,
   means applying rotation to said releaseable means,
   drive means,
   yoke means horizontally pivoted to said drive means whereby the vertical angle of said model may be adjusted and a velocity imparted to said model,
   impact means within said tube for stopping said drive means and said model whereby said model will be released for flight, and
   fluid spray receiving means within said model for controlling the temperature of said model.

References Cited
UNITED STATES PATENTS

| 3,276,251 | 10/1966 | Reed | 73—147 |
| 3,339,418 | 9/1967 | Paynter et al. | 73—432 |
| 3,342,066 | 9/1967 | Webb | 73—147 |

LOUIS R. PRINCE, Primary Examiner

JEFFREY NOLTON, Assistant Examiner